Dec. 23, 1930. G. GRAVITT 1,786,204
AUXILIARY LENS ATTACHMENT FOR EYEGLASSES
Filed June 2, 1927
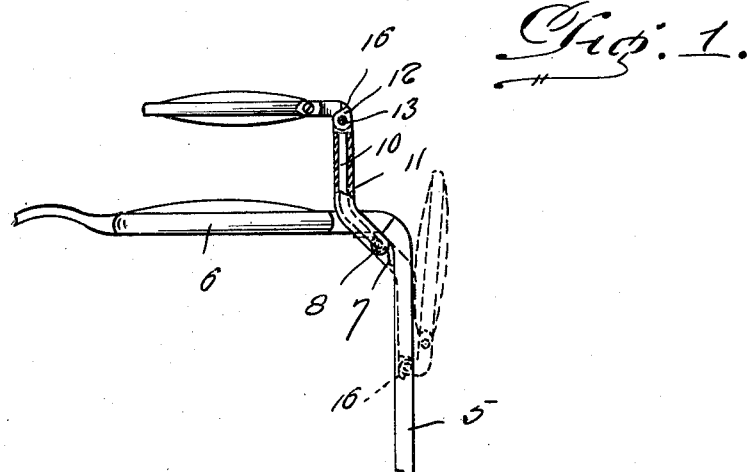
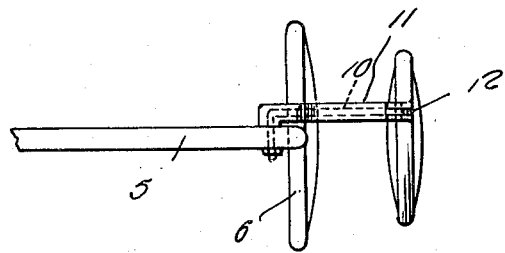
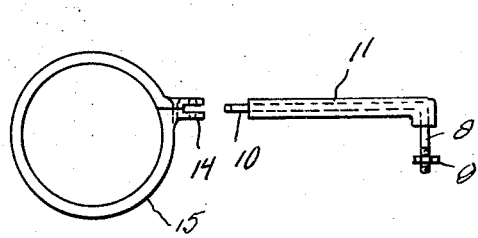
Inventor
Guy Gravitt,
By Clarence A. O'Brien
Attorney Patented Dec. 23, 1930

1,786,204

UNITED STATES PATENT OFFICE

GUY GRAVITT, OF LAWRENCEVILLE, ILLINOIS

AUXILIARY LENS ATTACHMENT FOR EYEGLASSES

Application filed June 2, 1927. Serial No. 196,066.

My invention relates to auxiliary lens attaching devices for eyeglasses and the like and is adapted primarily for providing a magnifying lens attachment for use by jewelers and arranged to be movable into or out of alinement with the main lens of the glasses. It is frequently necessary for jewelers to employ the use of a magnifying glass whereby to closely examine certain work, and it is customary in such instances for the jeweler to fit a separate lens in his eye which is retained therein by muscular contraction so that both hands will be free for use. Such practice has been found very unsatisfactory in view of the tendency of the magnifying glass to slip out of place and I accordingly propose movably attaching a magnifying lens of this nature upon an ordinary pair of eyeglasses whereby the same may be firmly secured in position for use or readily removed out of focus with the ordinary lens of the glasses when not in use.

Another object of the invention is to provide a hingedly connected attaching means for the magnifying lens which is simple in construction, neat in appearance and which may be arranged in attaching position upon the glasses without necessitating any changes or alterations in the construction thereof.

Other objects and advantages reside in the special construction, combination and arrangement of parts forming the invention as more fully hereinafter described and claimed, reference being had to the accompanying drawings forming part hereof, wherein:

Figure 1 is a plan view of a portion of eyeglass showing my invention in operative position thereon, Figure 2 is a side elevational view, and Figure 3 is a detail of the magnifying lens attaching link.

Referring now to the drawing I have shown my invention adapted for use in connection with an ordinary pair of eyeglasses having the usual side piece 5 for securing the same about the ear of the wearer and a glass retaining frame 6 hingedly connected as at 7 with the side piece 5. The hinge is provided with a retaining pin 8 extending vertically through the hinge having a nut 9 threadedly arranged on its lower end and its opposite end integrally formed with a rod 10 extending substantially at right angles thereto. The rod 10 preferably is formed of semi-rigid material such as wire whereby the same may be inserted through the bore of an angularly formed magnifying lens retaining link 11, one end of said link being arranged to rest upon the upper edge of the hinge 7. The rod 10 extends outwardly from the opposite end of the link 11 and is formed into a head 12 having an opening formed therethrough for receiving a pin 13 arranged in a yoke 14 formed at one side of a magnifying lens retaining frame 15. The head 12 is inserted between the arms of the yoke 14 for limited rotary movement, said head being provided with a lug 16 for engaging the inner end of the yoke whereby to prevent outward movement of the magnifying lens frame 15 beyond a parallel position with the eyeglass frame 16. This arrangement is necessary so that when the wearer of the glasses is looking downwardly the magnifying lens frame 15 will be prevented from swinging downwardly out of focus with the eyeglass lens.

As illustrated in Figure 1 of the drawing the pivotal connection at both ends of the link 11 permits the same to be moved to a position along the side of the member 5 as shown in dotted lines so as to prevent interference with the ordinary use of eyeglasses. It is apparent, however, that the magnifying lens may be readily and quickly moved into focusing position with respect to the ordinary lens of the glasses when so desired.

It is obvious that the invention is susceptible to various changes and modifications without departing from the spirit thereof or the scope of the appended claims and I accordingly claim all such forms of the device to which I am entitled.

I claim:

1. In a pair of eyeglasses having its glass frame hingedly connected to the side members thereof, a pivot pin for the hinges thereof, an angular rod formed integrally with said pin and having a head formed on one end thereof, a tubular link arranged upon the angular portion of said pin, an auxiliary lens frame having a yoke formed at one side thereof, means pivotally connecting said yoke upon said head, said auxiliary lens frame being adapted to move into or out of focusing position with respect to the lens of the eyeglass frame and means carried by the head engaging said yoke whereby to prevent the movement of the auxiliary lens frame beyond a position parallel with the eyeglass frame.

2. An auxiliary lens attachment for eyeglasses comprising a flexible rod pivotally mounted at one end to the eyeglass frame and having a head formed at its opposite end, a rigid sleeve on said rod with its opposite ends in abutting engagement with the eyeglass frame and said head, an auxiliary lens frame pivotally connected to the head on the rod and movable into and out of focusing position with respect to the eyeglass frame, and a nut threaded on the rod at the eyeglass end thereof and engageable with the eyeglass frame in a manner to frictionally bind the inner end of the sleeve against said eyeglass frame.

In testimony whereof I affix my signature.
GUY GRAVITT.